2,979,412
Patented Apr. 11, 1961

2,979,412

PREPARATION OF DEHYDRATED FRUIT HAVING THE CHARACTERISTICS OF SUN-DRIED FRUIT

Melvin E. Lazar, Oakland, George S. Smith, Concord, and Edward O. Chapin, Albany, Calif., assignors to the United States of America as represented by the Secretary of Agriculture No Drawing. Filed Oct. 14, 1959, Ser. No. 846,514

3 Claims. (Cl. 99—204)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel methods for preparing dehydrated fruit. In particular, the invention is concerned with the production of dehydrated fruit which has the desirable attributes of sun-dried fruit. Further objects and advantages of the invention will be evident from the following description wherein parts and percentages are by weight, unless otherwise specified.

In the following description the application of the invention to apricots is stressed as the invention is particularly adapted to processing of this fruit. However, the invention is not limited to apricots but may be applied to other types of fruit which present similar problems in producing a product having the desirable characteristics of sun-dried fruit.

In conventional practice, fresh apricots are halved, pitted, sulphured by contact with gaseous sulphur dioxide, then spread on trays and exposed to the sun until dry. The products have certain characteristics which are recognized and desired by consumers. Thus, the sun-dried products have a rich orange color, a translucent appearance, and a gummy texture. Although sun drying yields a product with these desirable characteristics, there are disadvantages to be reckoned with. Notable is the slowness of the process—requiring at least several days even when the fruit is exposed under ideal conditions to the bright sun in the California orchard areas. Another point is that the fruit is exposed to dust, insects, birds, rodents, etc., so that problems of sanitation are encountered. A further problem is the delay and danger of molding in the event of rain during the drying period.

In recent years, investigators have sought to apply artificial dehydration methods to apricots in order to alleviate these disadvantages. Various methods have been advocated and many of them yield excellent, nutritious products. Unfortunately, these products do not find a ready market because they do not resemble the sun-dried products which the consumer demands. As an example, if pitted fresh apricot halves are sulphured then dried by exposing them to a draft of hot air, the products have these characteristics: In color they are pale-yellowish instead of rich orange; in appearance they are opaque instead of translucent; in texture they are pithy rather than gummy. Although considerable research has been carried out on this problem, no practical solution has been reached heretofore.

By application of the process of the invention, one is enabled to obtain a product which has the desirable attributes of sun-dried apricots. Thus the products are rich orange in color, translucent in appearance and gummy in texture. In addition, the products have an excellent characteristic flavor which is superior to that of sun-dried apricots. In shape, the fruit pieces have the proper curl of the edges toward the cut surface in contrast to the flat slabs often obtained in artificial drying methods. Also, the products reconstitute more rapidly and completely than the sun-dried product.

From a procedural standpoint the invention offers these significant advantages—

(1) Elimination of dust, insect, bird, rodent, and mold contamination of product.

(2) The processing time is greatly reduced, that is, to a matter of hours rather than several days to weeks.

(3) The dependency on sunny weather is eliminated.

(4) The process is easily adapted for continuous operation, whereby labor requirements are reduced.

(5) The process minimizes loss of fruit juice and vitamins.

(6) The yield of product is high because there is no loss of product by reason of sticking to trays.

In applying the process of the invention, fresh apricots are first subjected to the conventional preliminary operations of washing, halving, pitting and placing on trays in the cups-up position. The whole fruit may be given a preliminary sulphuring—as by dipping in a solution of sulphur dioxide or alkali-metal sulphite or bisulphite, or by exposure to $SO_2$ gas— to prevent browning during these preliminary operations, particularly if there is any substantial delay between the successive steps of halving, pitting, and traying.

The trayed fresh apricot halves are then sulphured. This may be effected by spraying the fruit with a solution of sulphur dioxide or an alkali-metal sulphite or bisulphite. In the alternative the trays of fruit may be placed in a chamber where they are exposed to sulphur dioxide produced by burning sulphur or from commercial tanks of liquefied sulphur dioxide. In an other alternative, the fresh apricot halves are dipped in a solution of sulphur dioxide or alkali-metal sulphite or bisulphite and then spread on the trays. In any event the sulphuring should be sufficient that the fruit tissue contains 400 to 1000 pairs per million of $SO_2$, including that which is introduced by any previous sulphuring step if such is used. [The expression "p.p.m." is hereinafter employed to designate parts per million.] A greater proportion of $SO_2$ than 1000 p.p.m. may be employed if desired but is not necessary. The sulphuring step is required to preserve the natural color of the fruit during subsequent processing steps. Also, the sulphuring causes a plasmolysis of the fruit tissue which contributes toward obtaining a final product of desired translucency.

The sulphured fruit is then subjected to partial dehydration. This is preferably effected in any of the usual types of dehydration apparatus which provide a draft of heated air about the fruit pieces to cause rapid evaporation of moisture. Thus forced-air dehydrators of the tunnel, tray, or continuous belt type may be used. The temperature of the air should be as high as possible to obtain rapid evaporation of moisture yet not so high as to cause damage to color or flavor. Taking account of these factors, the preferred air temperature is 150 to 180° F., most preferably 180° F. Temperatures lower than this can of course be used but with slower rate of evaporation of moisture. In addition to high air temperature, such conditions as using through-flow air and high air velocity favor rapid evaporation of moisture. The dehydration is continued until the fruit has lost about 50% of its weight by elimination of moisture which means that substantially more than half of the moisture content of the fresh fruit is removed. Although it is preferred to conduct the partial dehydration to the extent that a 50% weight reduction is obtained, this factor may be varied depending on such factors as the maturity of the fruit to provide a weight reduction of 40 to 60%. Depending on the original moisture content of the fresh fruit, the partially dehydrated fruit will contain about 50 to 75% water.

After partial dehydration, the fruit is contacted with steam. This treatment provides several useful effects. One is that air within the fruit tissue is expelled. This is important to achieve a final product of bright orange color and translucent character; where air remains in the tissue, the final product is yellowish and opaque due to the presence of the minute air pockets in the tissue which by a reflectance phenomenon act like a white pigment. Secondly, the steaming causes a shrinking and densification of the fruit tissue. This is desirable to obtain a final product with a gummy texture rather than a pithy texture as common to conventional artificially-dehydrated apricots. Also, the steam treatment brings out the characteristic flavor associated with sun-dried apricots. Another point is that the steam treatment inactivates the enzymes in the fruit tissue thus ensuring that the flavor and color of the fruit will be preserved against enzymatic action during further processing and storage of the final product. The steam treatment must be continued for a period of time long enough for the changes described above to take place. For example, a steam treatment only long enough to inactivate enzymes or blanch the fruit is not enough; the treatment must be continued beyond this point to attain the desired deaeration, shrinking, densification, and flavor development. The proper time for the steam treatment may be determined by observing the apricots from time to time and continuing the treatment until the apricots develop a translucent appearance. However, the steam treatment should not be prolonged much beyond the point of obtaining translucency. Thus if the fruit is overcooked, the apricot halves will flatten out or "slab" as it is referred to in the industry. In this condition the apricots have a reduced value as they lack the desired shape of typical sun-dried apricots. That is, the slabs are flat pieces and lack the cupped edges of typical sun-dried apricots. A further point is that overcooking will result in the fruit pieces sticking to the trays resulting in loss of fruit and torn, low-grade, unsightly final products. Taking into account these considerations, the apricots are subjected to the steam treatment long enough to develop translucency and the treatment discontinued before slabbing can take place. In general, to obtain deaeration and other desired results without overcooking, the fruit is contacted with steam for a period about from 2 to 6 minutes, depending on the size and maturity of the fruit. Such factors as larger size and lesser degree of ripeness will require a longer steaming time than will smaller fruit or riper fruit.

It is to be noted that in the process of the invention, the steam treatment is applied after the partial dehydration. This is an important sequence which provides the proper changes in the fruit tissue noted above. Were the steam treatment to be applied to the fruit in its natural moisture condition, the fruit would flatten out or "slab" and stick to the trays thus yielding a very low quality end product and juice loss would be substantial.

Following steam treatment, the apricots are subjected to a second dehydration. This operation may be conducted in any of the types of driers and under the conditions mentioned in the paragraph on partial dehydration, supra. However, during this dehydration the maximum air temperature is controlled to avoid attaining a piece temperature above 160° F., thus to prevent darkening and flavor deterioration. The term "piece temperature" is used herein as referring to the temperature of the fruit tissue as opposed to temperature of the surrounding atmosphere. Generally, the second dehydration is continued until the moisture content of the apricots is 15 to 20%.

In applying the process of the invention, an important factor is the position of the apricot halves. Thus during the first dehydration, steaming, and second dehydration steps it is preferred that the fruit be positioned with the cups up. This manner of positioning prevents loss of valuable fruit constituents and enhances the appearance of the end product. Thus during the steaming operation and to some extent in the first part of the dehydration steps, a certain amount of juice will be formed on the cut surface of the fruit. When the halves are held in cups-up position, this juice is caught in the aperture formerly occupied by the pit and is not lost. Moreover, this juice dries down to form a glazed, syrup-like film on the cut surface of final product which is characteristic of good-quality sun-dried fruit. For maximum retention of juice it is further preferred that the fruit be maintained in cups-up position during the sulphuring step as well as the other steps previously referred to.

The dehydrated apricots produced in accordance with the invention may be treated by the same methods as are conventionally used in preparing sun-dried apricots for storage and subsequent marketing. That is, the fruit is exposed to sulphur dioxide until it has absorbed sufficient $SO_2$ to preserve it until ready for packaging and marketing. When the fruit is ready for packaging, it is remoistened to the moisture content desired for marketing and resulphured by conventional procedures. Remoistening is accomplished by either short-time immersion of the fruit in hot water or by contacting the fruit with steam until the fruit moisture content is increased to about 25%. The remoistened fruit is then exposed to sulphur dioxide, in accordance with conventional procedures, until the $SO_2$ content of the fruit is at the level desired for marketing.

As evident from the foregoing description the process of the invention is particularly adapted to the treatment of apricots. However, the invention may be applied to other fruit with similar benefits. Notable among these are pears, peaches, and nectarines. It is obvious that in the treatment of these fruits some adjustments of the conditions and procedures may be necessitated by the different properties of these fruits. For example, pears, peaches and nectarines are larger in size than apricots so that processing times such as time of dehydration and time of steaming will be extended proportionately to get like effect.

The invention is further demonstrated by the following example.

Ripe apricots were washed, dipped in 2% aqueous solution of $SO_2$ for five minutes than halved and pitted. The fruit was then dipped in 1% aqueous $SO_2$ solution for one minute, then spread in a single layer cups-up on trays at a loading of about 2 lbs./sq. ft. The $SO_2$ content of the fruit was 418 p.p.m. The fruit was placed on the trays was dehydrated to about 50% of initial fresh weight using cross-flow air heated to 180° F. which required about 2¼ hours. The partially-dried fruit was then contacted with live steam (212° F.) for four minutes without disturbing the position of the fruit on the trays. The trays of partially-dried, steamed fruit were returned to the dryer and dehydration was continued at an air temperature of 160° F. until the moisture content of the fruit was about 17%. This second dehydration required about 7 hours. It was observed that the product had a rich orange color, translucent appearance, and a gummy texture. Also the product had the characteristic shape with inturned edges typical of sun-dried apricots. In flavor, the products were superior to the best quality sun-dried apricots. Moreover, the products were more uniform in color and shape and rehydrated faster on contact with water.

Having thus described the invention, what is claimed is:

1. A method of preparing dehydrated fruit having the desirable characteristics of sun-dried fruit which comprises sulphuring fresh fruit pieces, subjecting the fruit to rapid dehydration in a current of hot air at a temperature of about from 150 to 180° F. until the weight of the fruit is reduced to about 40–60% of its initial fresh weight, contacting the partly-dehydrated fruit with steam for a period within the range about 2 to 6 minutes, long enough to cause a shrinking and densification of the fruit and to expel air from the tissues to render the fruit translucent but not long enough to obtain slabbing, and subjecting the steamed fruit to rapid dehydration in a current of hot air at a piece temperature not exceeding 160° F. until the moisture content of the fruit is about 15 to 20%.

2. A method of preparing dehydrated apricots having the rich-orange color, translucent appearance, and gummy texture of sun-dried apricots which comprises, (a) sulphuring fresh, pitted apricot halves, (b) subjecting the fruit to rapid dehydration in a current of hot air at a temperature about from 150 to 180° F. until the weight of the fruit is reduced to about 40–60% of its initial fresh weight, (c) contacting the partly-dehydrated fruit with steam for a period within the range about from 2 to 6 minutes, long enough to cause a shrinking and densification of the fruit and to expel air from the tissues to render the first translucent but not long enough to obtain slabbing, and (d) subjecting the steamed fruit to rapid dehydration in a current of hot air at a piece temperature not exceeding 160° F. until the moisture content of the fruit is about 15–20%.

3. The method of claim 2 wherein the fruit is maintained in a cups-up position during steps b, c, and d.

References Cited in the file of this patent

UNITED STATES PATENTS

| | | |
|---|---|---|
| 2,718,470 | Kaufman et al. | Sept. 20, 1955 |
| 2,895,836 | Lazar et al. | July 21, 1959 |
| 2,901,359 | Forkner | Aug. 25, 1959 |

UNITED STATES PATENT OFFICE

CERTIFICATE OF CORRECTION

Patent No. 2,979,412                          April 11, 1961

Melvin E. Lazar et al.

It is hereby certified that error appears in the above numbered patent requiring correction and that the said Letters Patent should read as corrected below.

Column 2, line 40, for "pairs" read -- parts --; column 6, line 5, for "first" read -- fruit --.

Signed and sealed this 12th day of September 1961.

(SEAL)
Attest:

ERNEST W. SWIDER
Attesting Officer

DAVID L. LADD
Commissioner of Patents
USCOMM-DC